United States Patent
Vacca et al.

(10) Patent No.: US 7,302,919 B2
(45) Date of Patent: Dec. 4, 2007

(54) CONTROL VALVE WITH IMPROVED SEALING FOR A FLUID CIRCULATION SYSTEM

(75) Inventors: Frederic Vacca, Behoust (FR); Mathieu Chanfreau, Saulx Marchais (FR)

(73) Assignee: Valeo Systemes Thermiques S.A.S., Le Mesnil Saint Denis (FR)

( * ) Notice: Subject to any disclaimer, the term of this patent is extended or adjusted under 35 U.S.C. 154(b) by 0 days.

(21) Appl. No.: 10/540,807

(22) PCT Filed: Dec. 23, 2003

(86) PCT No.: PCT/FR03/03881

§ 371 (c)(1),
(2), (4) Date: Mar. 8, 2006

(87) PCT Pub. No.: WO2004/061342

PCT Pub. Date: Jul. 22, 2004

(65) Prior Publication Data

US 2006/0214017 A1   Sep. 28, 2006

(30) Foreign Application Priority Data

Dec. 30, 2002  (FR) .................................. 02 16856

(51) Int. Cl.
*F16K 11/085* (2006.01)
(52) U.S. Cl. ................ 123/41.1; 123/41.08; 123/41.85
(58) Field of Classification Search ............... 123/41.1, 123/41.08, 41.85
See application file for complete search history.

(56) References Cited

U.S. PATENT DOCUMENTS

| | | | | |
|---|---|---|---|---|
| 5,529,026 A | * | 6/1996 | Kurr et al. | 123/41.1 |
| 5,617,815 A | * | 4/1997 | Spies et al. | 123/41.1 |
| 6,164,248 A | * | 12/2000 | Lehmann | 123/41.1 |
| 6,539,899 B1 | * | 4/2003 | Piccirilli et al. | 123/41.1 |
| 6,688,333 B2 | * | 2/2004 | McLane et al. | 137/625.11 |
| 6,976,505 B2 | * | 12/2005 | McLane et al. | 137/625.11 |
| 7,096,831 B2 | * | 8/2006 | Finkbeiner et al. | 123/41.1 |
| 2006/0201455 A1 | * | 9/2006 | Chanfreau et al. | 123/41.1 |

FOREIGN PATENT DOCUMENTS

GB   934531 A2   *  8/1963

* cited by examiner

*Primary Examiner*—Stephen K. Cronin
*Assistant Examiner*—Jason Benton
(74) *Attorney, Agent, or Firm*—Howard & Howard Attorneys, P.C.

(57) ABSTRACT

A control valve (10) for a fluid circulation circuit comprises a body (12) which is equipped with a fluid inlet (18) and with at least two fluid outlets (20, 22, 24) and which delimits a housing of revolution for an adjusting element (26) able to rotate about an axis of rotation (XX) and to adopt various angular positions to control the distribution of fluid through the outlets. The adjusting member (26) is surrounded by a sealing ring (42) in the form of an open annulus, which rotates as one with the adjusting member and is arranged with a small clearance around the adjusting member, this allowing the sealing ring to be pressed firmly internally against a side wall (16) into which the fluid outlets (20, 22, 24) open with a view to ensuring sealing under the action of the pressure of the fluid. Application in particular to motor vehicle fluid circuits.

20 Claims, 3 Drawing Sheets

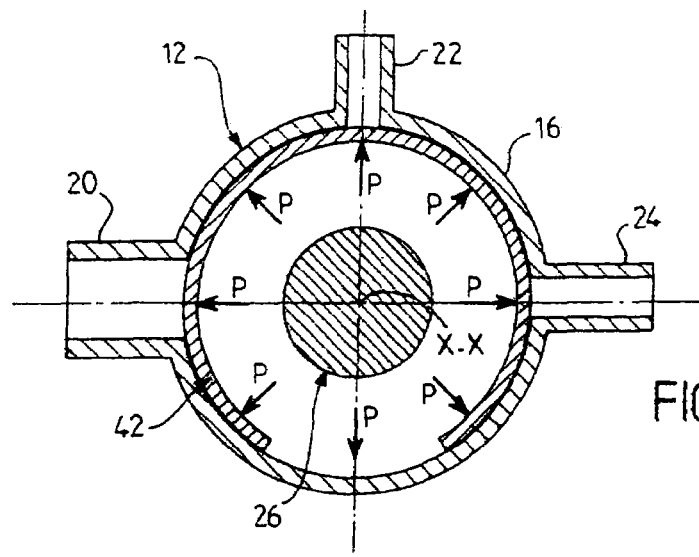
FIG. 4
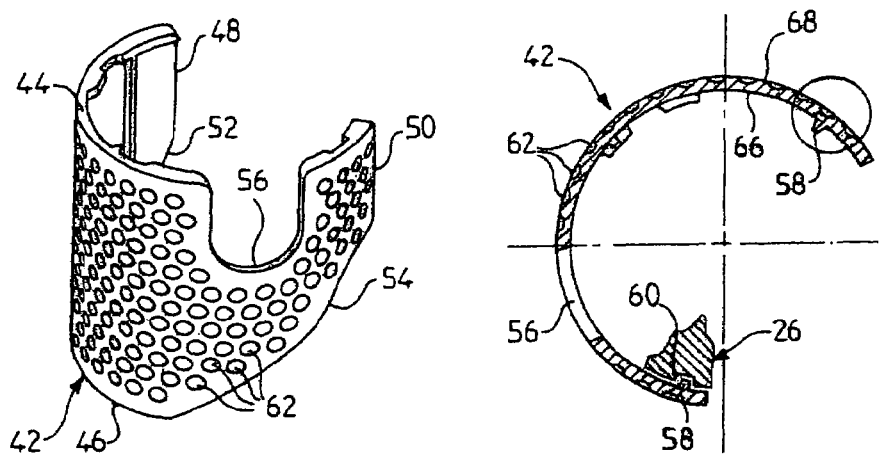
FIG. 5                                   FIG. 6
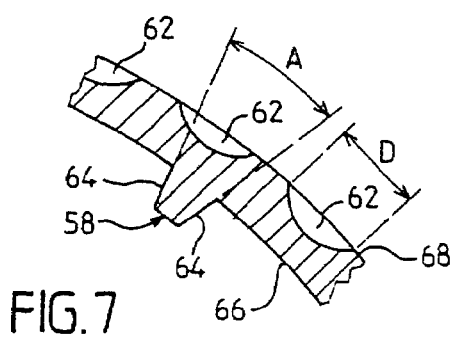
FIG. 7

CONTROL VALVE WITH IMPROVED SEALING FOR A FLUID CIRCULATION SYSTEM

The invention relates to a control valve intended for a fluid circulation circuit, particularly for a motor vehicle combustion engine cooling circuit.

The valve of the invention is of the type comprising a body which is equipped with a fluid inlet and with at least two fluid outlets and which delimits a housing of revolution for an adjusting element able to rotate about an axis of rotation and to adopt various angular positions to control the distribution of fluid through the outlets, the body comprising an end wall into which the fluid inlet opens and a side wall into which the fluid outlets open.

Such a valve may be qualified as a "rotary valve" in so far as its adjusting member rotates about an axis of rotation. In a valve of this type, the side wall usually delimits a cylindrical housing able to accommodate the adjusting member which has a homologous cylindrical shape.

The fluid that enters the valve body via the fluid inlet is distributed between the fluid outlets according to the angular position of the adjusting member.

In a control valve of this type, it is necessary to ensure sealing between the adjusting member and the side wall of the valve body. This sealing is aimed at preventing any accidental leak of fluid to an outlet when this outlet is supposed to be closed off by the adjusting member.

Various solutions have already been proposed in order to ensure such sealing.

This sealing may be provided directly by contact between the respective materials of the valve body and of the adjusting member.

Sealing may also call upon an intermediate seal, for example in the form of a liner, interposed between the adjusting member and the side wall of the valve body.

In all these known solutions, contact between the adjusting member and the side wall of the valve body tends to generate friction which has to be overcome when the adjusting member is turned.

This therefore entails a significant force, either by hand or by way of an actuator, when performing said turning.

It is a particular object of the invention to overcome the aforementioned disadvantages.

The invention is aimed in particular at affording a control valve of the above type in which friction between the adjusting member and the valve body is reduced, while at the same time guaranteeing better sealing between these components.

According to the invention, the adjusting member is surrounded by a sealing ring in the form of an open annulus, which rotates as one with the adjusting member and is arranged with a small clearance around the adjusting member, this allowing the sealing ring to be pressed firmly internally against the side wall with a view to ensuring sealing under the action of the pressure of the fluid.

Thus, sealing is ensured by the pressure of the fluid which becomes embroiled between the adjusting member proper and the sealing ring, because of the clearance there is between them.

This solution entails that there be an annular space, even a partial one, between the adjusting member and the sealing ring to allow the fluid to access this region and exert its pressure against the sealing ring.

Furthermore, this solution offers the advantage of compensating for wear of the sealing ring.

The clearance between the adjusting member and the sealing ring is, for example, 1/10 to 1 mm, particularly around 3/10 mm.

In the invention, the sealing ring is made of a material with a low coefficient of friction. It may in particular be a material of the polyamide type or alternatively of the polytetrafluoroethylene (PTFE) type.

According to another feature of the invention, the sealing ring comprises a smooth exterior surface into which a multitude of uniformly spaced blind holes open, this making it possible to reduce the area of contact between the sealing ring and the side wall.

This reduction in the contact area contributes to reducing the friction without compromising the sealing.

Advantageously, the ratio between the surface area of the blind holes and the smooth surface area of the sealing ring is between 25% and 40%. This ratio is preferably close to 33%.

The blind holes, which are not through-holes, advantageously have a circular contour. In particular, they may each have the form of a cap of a sphere.

According to yet another feature of the invention, the adjusting member and the sealing ring have reliefs of mating shapes to allow them to be made to rotate as one.

In a preferred embodiment of the invention, the side wall of the valve body delimits a cylindrical housing and the sealing ring has a cylindrical exterior surface.

In one embodiment, the fluid inlet opens axially into the end wall, whereas the fluid outlets open radially into the side wall of the valve body.

According to another aspect, the invention relates to a fluid circulation circuit, comprising a control valve as defined hereinabove, the fluid inlet of which is connected to a fluid source and the fluid outlets of which are connected respectively to branches of the circuit.

Such a circuit is advantageously produced in the form of a cooling circuit for the combustion engine of a motor vehicle, through which a cooling fluid passes under the action of a circulation pump.

The control valve therefore advantageously constitutes a three-way valve, the fluid inlet of which is connected to an intake for cooling fluid arriving from the engine and the three fluid outlets of which are connected respectively to a first branch of the circuit which contains a cooling radiator, to a second branch of the circuit which bypasses the cooling radiator, and to a third branch of the circuit which contains a heater matrix for heating the cabin.

In the description that follows, given solely by way of example, reference is made to the attached drawings, in which, FIG. 1 is a perspective view of a control valve, of the three-way valve type, according to one embodiment of the invention;

FIG. 4 is a schematic view in section of the control valve of FIGS. 1 and 2, the plane of section being perpendicular to the axis of rotation of the adjusting member;

FIG. 5 is a perspective view of the sealing ring;

FIG. 6 is a view in cross section of the sealing ring of FIG. 5;

FIG. 7 is a detail on a larger scale of FIG. 6;

Figure 1:
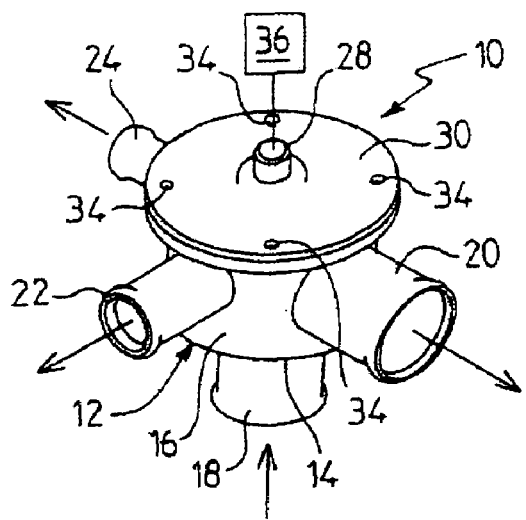
Figure 2:
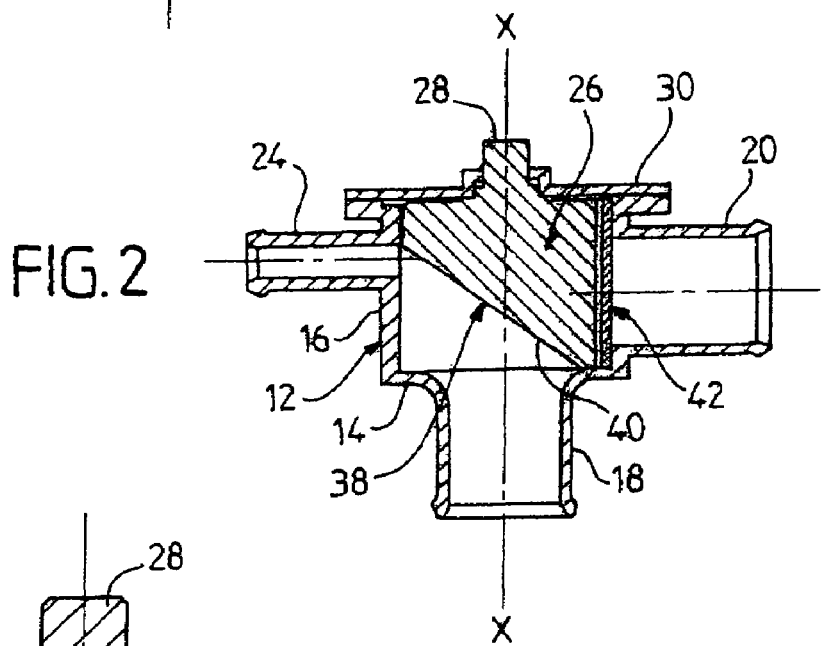
FIG. 2 is a view in section of the control valve for FIG. 1, the plane of section passing through the axis of rotation of the adjusting member.

FIGS. 1 and 2 show a control valve 10 which comprises a cylindrical body 12 bounded by an end wall 14 and a cylindrical side wall 16 of axis XX. A fluid inlet duct 18 opens axially into the end wall 14. Three fluid outlet ducts 20, 22 and 24 open into the cylindrical side wall 16. In the example, the outlet ducts 20, 22 and 24 open radially into the wall 16. The ducts 20 and 24 are diametrically opposed, while the duct 22 makes an angle of 90° to the common axis of the ducts 20 and 24. Furthermore, the ducts 20, 22 and 24 have successively decreasing diameters.

Housed inside the valve body 12 is an adjusting member 26, also known as a rotary member, produced in the form of a generally cylindrical element extended by a rod 28 directed along the axis XX. This rod 28 passes through a central opening exhibited by a cover 30 of circular shape. This cover is screwed onto a flange 32 of the valve body by means of four fixing screws 34, with the interposition of a seal (not depicted). The adjusting member 26 is driven in rotation about the axis XX by motorizing means 36 depicted schematically in FIG. 1. These may, for example, be a motor of the stepping type able to bring the adjusting member 26 into a multitude of different positions, either in successive increments or continuously.

The adjusting member 26 comprises a truncated end 38 consisting, in the example, of a planar face 40 forming an angle close to 45° with the axis of rotation XX. Thus, the adjusting member 26 allows the fluid outlets 20, 22 and 24 to be controlled with a law defined according to its angular position in the valve body.

Figure 3:
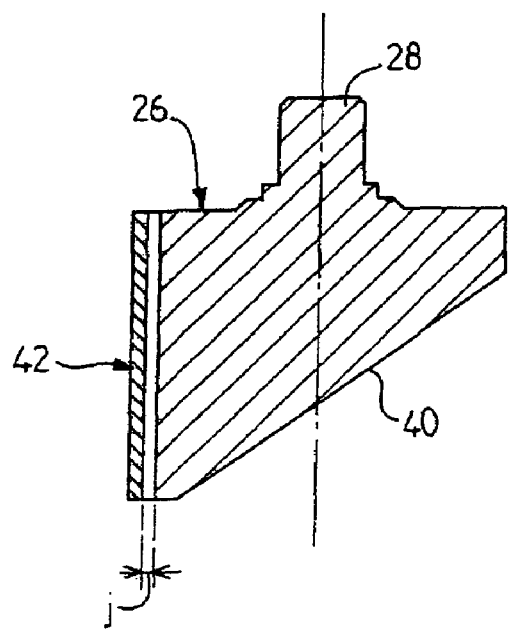
FIG. 3 is a corresponding view in section of the adjusting member and of the sealing ring with which it is fitted.

According to the invention, the adjusting member 26 is surrounded, over part of its periphery, by a sealing ring 42 in the form of an open annulus, which rotates as one with the adjusting member and is able to come into sealing contact with the internal face of the side wall 16. This sealing ring, the shape of which is better apparent in FIGS. 5 to 7, is arranged with a small clearance j (FIG. 3) around the adjusting member. This allows the fluid entering the valve body via the inlet duct 18 to exert pressure directed radially outward and acting against the interior of the sealing ring 42 so as to press it firmly radially against the side wall 16 with a view to ensuring sealing. This pressure is shown by the radial arrows P in FIG. 4. This FIG. 4 constitutes a schematic drawing and, in particular, the adjusting member 26 is depicted schematically, the clearance there is to the sealing ring having been deliberately very much exaggerated.

As can be seen more particularly in FIGS. 5 and 6, the sealing ring 42, in the form of an open annulus, has a generally cylindrical surface which hugs the truncated shape of the envelope of the adjusting member 26. The ring 42 is bounded at its top by an edge 44 in the shape of an arc of a circle, at its bottom by an edge 46 also in the shape of an arc of a circle, by two edges 48 and 50 generally parallel to the axis and by inclined edges 52 and 54. A cutout 56 formed from the edge 44 is also provided. On its interior face, the ring 42 comprises ribs 58, parallel to the axis, each intended to collaborate with a groove 60, also parallel to the axis, formed at the periphery of the adjusting member (FIG. 6). This allows the sealing ring to rotate as one with the adjusting member and allows the fluid to enter the intermediary space between the adjusting member and the sealing ring.

The sealing ring is made of a material with a low coefficient of friction, for example polytetrafluoroethylene (PTFE), or alternatively a polyamide, etc. In order to further reduce the friction between the sealing ring and the internal face of the side wall 16, this sealing ring comprises a smooth exterior surface into which a multitude of uniformly distributed blind holes 62 open. These blind holes are better apparent in FIGS. 5 to 7. As can be seen in the figures, each of the blind holes, that is to say holes which are not through-holes, has a circular contour. In the example, each of the blind holes has the from of a cap of a sphere (see FIG. 7).

In the exemplary embodiment depicted, the rib 58, that can also be seen in the detail of FIG. 7, is bounded by two radial walls 64 which make an angle A between them, here 30°. The radial walls 64 meet an interior face 66 of the sealing ring, opposite an exterior face 68 in which the blind holes 62 are formed (FIGS. 6 and 7).

Here, the blind holes each have a diameter (D) suitably chosen according to the axial spacing and the radial spacing between the blind holes.

Figure 8:
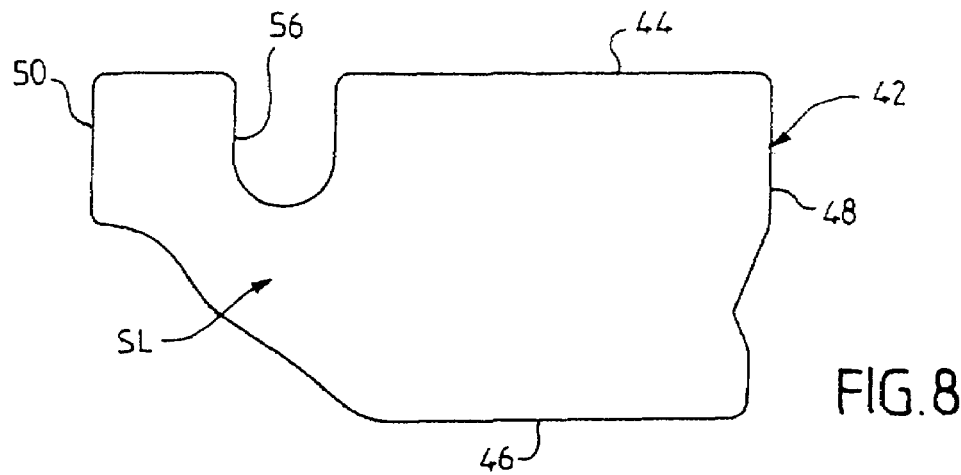
FIG. 8 depicts the developed surface of the sealing ring, without the blind holes.

FIG. 8 depicts the smooth surface area SL of the sealing ring, without the blind holes 62.

Figure 9:
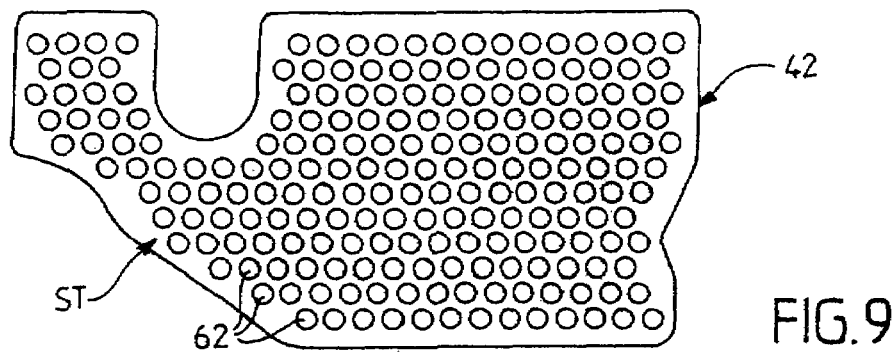
FIG. 9 is a view similar to FIG. 8 with the blind holes.

FIG. 9 depicts the same surface area with the blind holes 62. The total surface area of the blind holes is here denoted ST.

A ratio R between the surface area of the blind holes and the smooth surface area SL may be defined; here R=ST/SL, and this can be used to characterize the percentage of the smooth surface area occupied by the blind holes in question. In general, it is advantageous for this ratio R to be between 25% and 40%, preferably close to 33%.

In one exemplary embodiment, the smooth surface area SL is 4473 m$^2$. The blind holes 62 each have a diameter of 3 mm and are separated from one another by an axial spacing of 4 mm and a radial spacing of 4.45 mm. As a result, the surface area ST here is 1428 m$^2$, which gives a ratio R more or less equal to ⅓ or 33%.

As a result, under these conditions, the frictional torque between the sealing ring and the valve body is reduced by approximately ⅓ by comparison with the frictional torque that would result from a sealing ring that had a smooth surface.

Under these conditions it is possible, all other things being equal, to use lower powered motorizing means 36, and to do so without compromising the sealing characteristics.

Figure 10:
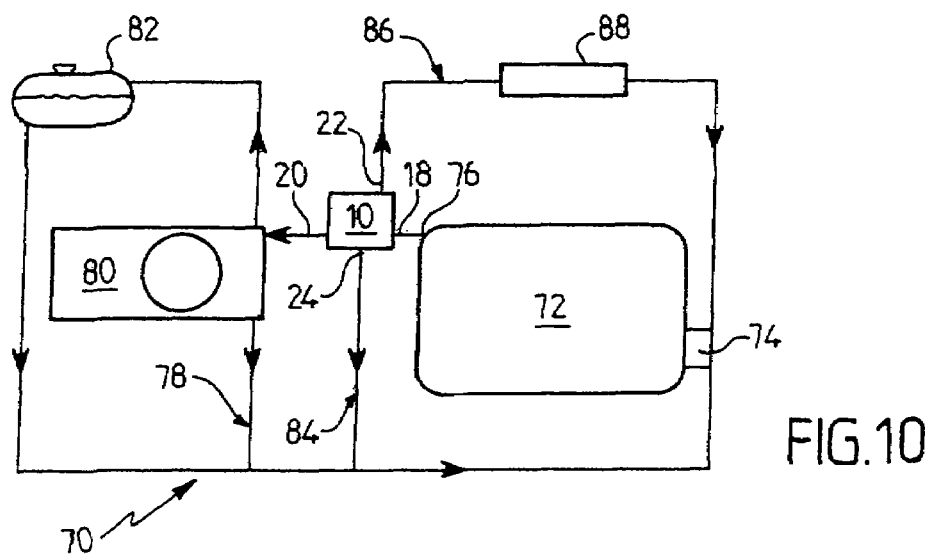
FIG. 10 depicts a motor vehicle combustion engine cooling circuit equipped with a control valve according to the invention.

The valve of the invention finds a particular application in the field of motor vehicles. FIG. 10 shows a circuit 70 for cooling the combustion engine 72 of a motor vehicle. The circuit 70 has, passing through it, a cooling fluid, usually water with an antifreeze added, which circulates under the action of a pump 74. The fluid, heated up by the engine, leaves the engine via an outlet 76 which is connected to the inlet duct 18 of a control valve 10 of the type described hereinabove. This valve comprises three outlet ducts 20, 22 and 24 which are connected to three branches of the circuit.

This circuit comprises a first branch 78 which contains a cooling radiator 80 and an expansion tank 82, a second branch 84 which bypasses the cooling radiator 80 and the expansion tank 82, and a third branch 86 which contains a heater matrix 88 used to heat the cabin of the vehicle.

The duct 20 is connected to the branch 78 (radiator), the duct 22 is connected to the branch 86 (heater matrix) and the duct 24 to the branch 84 (bypass). The valve thus allows the flow rates of fluid in the three aforementioned branches of the circuit to be controlled independently so as to optimize the temperature of the combustion engine and the heating of the cabin.

Of course, the invention is not restricted to the embodiment as described hereinabove and applies to other variants. Thus, the shape of revolution defined by the valve body is not necessarily cylindrical and could, for example, be conical or frustoconical. The number and mutual arrangement of the outlet ducts can also be varied in numerous ways according to the applications considered.

In general, the valve of the invention finds a particular application in the motor industry.

The invention claimed is:

1. A control valve for a fluid circulation circuit, comprising a body (12) which is equipped with a fluid inlet (18) and with at least two fluid outlets (20, 22, 24) and which delimits a housing of revolution for an adjusting element (26) able to rotate about an axis of rotation (XX) and to adopt various angular positions to control the distribution of fluid through the outlets, the body (12) comprising an end wall (14) into which the fluid inlet opens and a side wall (16) into which the fluid outlets open, characterized in that the adjusting member (26) is surrounded by a sealing ring (42) in the form of an open annulus, which rotates as one with the adjusting member (26) and is arranged with a small clearance (j) around the adjusting member, this allowing the sealing ring to be pressed firmly internally against the side wall (16) with a view to ensuring sealing under the action of the pressure (P) of the fluid.

2. The control valve as claimed in claim 1, characterized in that the sealing ring (42) is made of a material with a low coefficient of friction.

3. The control valve as claimed in claim 2, characterized in that the material with a low coefficient of friction is chosen from polyamides and polytetrafluoroethylene.

4. The control valve as claimed in claim 1, characterized in that the sealing ring (42) comprises a smooth exterior surface into which a multitude of uniformly spaced blind holes (62) open, this making it possible to reduce the area of contact between the sealing ring (42) and the side wall (16).

5. The control valve as claimed in claim 4, characterized in that the ratio (R) between the surface area (ST) of the blind holes (62) and the smooth surface area (SL) of the sealing ring (42) is between 25% and 40%, preferably close to 33%.

6. The control valve as claimed in claim 4, characterized in that the blind holes (62) have a circular contour.

7. The control valve as claimed in claim 6, characterized in that the blind holes (62) have the form of caps of a sphere.

8. The control valve as claimed in claim 1, characterized in that the adjusting member (26) and the sealing ring (42) have reliefs (58, 60) of mating shapes to allow them to be made to rotate as one.

9. The control valve as claimed in claim 1, characterized in that the side wall (16) of the valve body delimits a cylindrical housing and in that the sealing ring (42) has a cylindrical exterior surface.

10. The control valve as claimed in claim 1, characterized in that the fluid inlet (18) opens axially into the end wall (14), and in that the fluid outlets (20, 22, 24) open radially into the side wall (16) of the valve body.

11. A fluid circulation circuit, characterized in that it comprises a control valve as claimed in claim 1, the fluid inlet (18) of which is connected to a fluid source (76) and the fluid outlets (20, 22, 24) of which are connected respectively to branches (78, 86, 84) of the circuit.

12. The fluid circulation circuit as claimed in claim 11, characterized in that it is produced in the form of a cooling circuit (70) for the combustion engine (72) of a motor vehicle, through which a cooling fluid passes under the action of a circulation pump (74), and in that the control valve (10) is a three-way valve, the fluid inlet (18) of which is connected to an intake (76) for cooling fluid arriving from the engine (72) and the three fluid outlets (20, 22, 24) of which are connected respectively to a first branch (78) of the circuit which contains a cooling radiator (80), to a second branch (84) of the circuit which bypasses the cooling radiator (80), and to a third branch (86) of the circuit which contains a heater matrix (88) for heating the cabin.

13. The control valve as claimed in claim 2, characterized in that the sealing ring (42) comprises a smooth exterior surface into which a multitude of uniformly spaced blind holes (62) open, this making it possible to reduce the area of contact between the sealing ring (42) and the side wall (16).

14. The control valve as claimed in claim 3, characterized in that the sealing ring (42) comprises a smooth exterior surface into which a multitude of uniformly spaced blind holes (62) open, this making it possible to reduce the area of contact between the sealing ring (42) and the side wall (16).

15. The control valve as claimed in claim 5, characterized in that the blind holes (62) have a circular contour.

16. The control valve as claimed in claim 4, characterized in that the adjusting member (26) and the sealing ring (42) have reliefs (58, 60) of mating shapes to allow them to be made to rotate as one.

17. A fluid circulation circuit, characterized in that it comprises a control valve as claimed in claim 4, the fluid inlet (18) of which is connected to a fluid source (76) and the fluid outlets (20, 22, 24) of which are connected respectively to branches (78, 86, 84) of the circuit.

18. The fluid circulation circuit as claimed in claim 17, characterized in that it is produced in the form of a cooling circuit (70) for the combustion engine (72) of a motor vehicle, through which a cooling fluid passes under the action of a circulation pump (74), and in that the control valve (10) is a three-way valve, the fluid inlet (18) of which is connected to an intake (76) for cooling fluid arriving from the engine (72) and the three fluid outlets (20, 22, 24) of which are connected respectively to a first branch (78) of the circuit which contains a cooling radiator (80), to a second branch (84) of the circuit which bypasses the cooling radiator (80), and to a third branch (86) of the circuit which contains a heater matrix (88) for heating the cabin.

19. A fluid circulation circuit, characterized in that it comprises a control valve as claimed in claim 8, the fluid inlet (18) of which is connected to a fluid source (76) and the fluid outlets (20, 22, 24) of which are connected respectively to branches (78, 86, 84) of the circuit.

20. The fluid circulation circuit as claimed in claim 19, characterized in that it is produced in the form of a cooling circuit (70) for the combustion engine (72) of a motor vehicle, through which a cooling fluid passes under the action of a circulation pump (74), and in that the control valve (10) is a three-way valve, the fluid inlet (18) of which is connected to an intake (76) for cooling fluid arriving from the engine (72) and the three fluid outlets (20, 22, 24) of which are connected respectively to a first branch (78) of the circuit which contains a cooling radiator (80), to a second branch (84) of the circuit which bypasses the cooling radiator (80), and to a third branch (86) of the circuit which contains a heater matrix (88) for heating the cabin.

* * * * *